(12) United States Patent
Gleasman et al.

(10) Patent No.: US 7,416,045 B2
(45) Date of Patent: Aug. 26, 2008

(54) DUAL HYDRAULIC MACHINE TRANSMISSION

(75) Inventors: Keith E. Gleasman, Fairport, NY (US); Matthew R. Wrona, Fairport, NY (US)

(73) Assignee: Torvec, Inc., Rochester, NY (US)

(*) Notice: Subject to any disclaimer, the term of this patent is extended or adjusted under 35 U.S.C. 154(b) by 590 days.

(21) Appl. No.: 11/153,111

(22) Filed: Jun. 15, 2005

(65) Prior Publication Data

US 2005/0247504 A1 Nov. 10, 2005

Related U.S. Application Data

(63) Continuation-in-part of application No. 10/789,739, filed on Feb. 27, 2004, now Pat. No. 6,983,680, which is a continuation-in-part of application No. 10/647,557, filed on Aug. 25, 2003, now abandoned, which is a continuation-in-part of application No. 10/229,407, filed on Aug. 28, 2002, now abandoned.

(51) Int. Cl.
*B60K 17/00* (2006.01)
*F16D 31/02* (2006.01)

(52) U.S. Cl. .................. 180/305; 180/307; 60/431; 60/448; 60/449

(58) Field of Classification Search ............... 180/305, 180/307; 60/431, 448, 449
See application file for complete search history.

(56) References Cited

U.S. PATENT DOCUMENTS

| | | | |
|---|---|---|---|
| 1,840,865 A | 1/1932 | Rayburn et al. | 60/453 |
| 1,931,543 A | 10/1933 | High | 417/269 |
| 2,166,857 A | 7/1939 | Bugatti | 92/153 |
| 2,672,095 A | 3/1954 | Lucien et al. | 417/269 |
| 2,678,536 A | 5/1954 | Morgan | 60/455 |
| 2,913,993 A | 11/1959 | Toulmin, Jr. | 91/488 |
| 2,957,421 A | 10/1960 | Mock | 417/222.1 |
| 3,018,737 A | 1/1962 | Cook et al. | 417/269 |
| 3,056,387 A | 10/1962 | Budzich | 91/507 |
| 3,161,023 A | 12/1964 | Margolin et al. | 60/488 |
| 3,199,286 A | 8/1965 | Anderson | 60/420 |
| 3,292,554 A | 12/1966 | Hessler | 417/269 |
| 3,304,886 A | 2/1967 | Roberts | 417/222.1 |
| 3,616,726 A | 11/1971 | Ruger | 91/488 |
| 3,641,765 A | 2/1972 | Hancock et al. | 60/484 |
| 3,861,276 A | 1/1975 | Lucien | 91/499 |
| 3,900,075 A | 8/1975 | Chichester et al. | 180/6.3 |
| 3,902,566 A | 9/1975 | Bird | 180/306 |
| 3,927,528 A * | 12/1975 | van der Kolk et al. | 60/431 |

(Continued)

*Primary Examiner*—Christopher Ellis
*Assistant Examiner*—John R Olszewski
(74) *Attorney, Agent, or Firm*—Brown & Michaels, PC

(57) ABSTRACT

The modular transmission uses only a pair of small and light hydraulic machines of remarkably improved volumetric efficiency with pistons having body portions substantially as long as the axial length of the respective cylinders in which they reciprocate. The two hydraulic machines operate in a closed loop, one being used as a pump driven by the vehicle's engine, and the other used as a motor. Each machine has a fully articulatable swash plate. By computer control, the angles of the swash plates of the two machines are infinitely varied to provide an appropriate optimum ratio of engine/wheel speed for all conditions from start-up, city driving, hill climbing varied according to load and steepness, and overdrive for highway. This complete vehicle operation is attained while the vehicle's engine continues to operate at relatively constant speeds and relatively low RPM.

10 Claims, 10 Drawing Sheets

U.S. PATENT DOCUMENTS

| | | | |
|---|---|---|---|
| 4,007,663 A | 2/1977 | Nagatomo et al. | 91/6.5 |
| 4,175,389 A | 11/1979 | Shiber | 60/414 |
| 4,196,586 A | 4/1980 | Shiber | 60/414 |
| 4,196,587 A | 4/1980 | Shiber | 60/414 |
| 4,223,532 A | 9/1980 | Shiber | 60/414 |
| 4,232,587 A | 11/1980 | Kline | 91/499 |
| 4,240,515 A | 12/1980 | Kirkwood | 180/165 |
| 4,282,711 A | 8/1981 | Branstetter | 60/395 |
| 4,366,671 A | 1/1983 | Chichester | 60/444 |
| 4,373,605 A | 2/1983 | Sheppard | 180/308 |
| 4,395,199 A * | 7/1983 | Izumi et al. | 417/53 |
| 4,399,886 A | 8/1983 | Pollman | |
| 4,478,130 A | 10/1984 | Brenner et al. | 91/6.5 |
| 4,484,655 A | 11/1984 | Sheppard | 180/308 |
| 4,530,416 A | 7/1985 | Kassai | 180/307 |
| 4,531,431 A * | 7/1985 | Dreher et al. | 477/2 |
| 4,637,293 A | 1/1987 | Yamaguchi et al. | 91/507 |
| 4,679,396 A | 7/1987 | Heggie | 60/414 |
| 4,776,260 A | 10/1988 | Vincze | 417/269 |
| 4,843,817 A | 7/1989 | Shivvers et al. | 60/488 |
| 4,852,463 A | 8/1989 | Wagenseil | 91/488 |
| 4,886,142 A | 12/1989 | Yamaoka et al. | 180/242 |
| 4,888,949 A * | 12/1989 | Rogers | 60/434 |
| 4,901,529 A | 2/1990 | Iino et al. | 60/489 |
| 4,913,005 A | 4/1990 | Ishikawa et al. | |
| 4,944,154 A | 7/1990 | Kawahara et al. | 60/488 |
| 4,967,556 A | 11/1990 | Inoue | 60/489 |
| 4,993,380 A | 2/1991 | Hsu | 92/153 |
| 5,000,667 A | 3/1991 | Taguchi et al. | 417/222.1 |
| 5,147,010 A | 9/1992 | Olson et al. | 180/197 |
| 5,177,964 A | 1/1993 | Tanaka et al. | 60/445 |
| 5,440,878 A | 8/1995 | Gleasman et al. | 60/487 |
| 5,495,912 A | 3/1996 | Gray, Jr. et al. | |
| 5,505,527 A | 4/1996 | Gray et al. | 303/3 |
| 5,513,553 A | 5/1996 | Gleasman et al. | 92/12.2 |
| 5,560,447 A | 10/1996 | Ishii et al. | 180/242 |
| 5,607,027 A | 3/1997 | Puett et al. | 180/242 |
| 5,630,707 A | 5/1997 | Kim et al. | 417/269 |
| 5,704,272 A | 1/1998 | Durako et al. | 92/57 |
| 5,720,360 A | 2/1998 | Clark et al. | 180/305 |
| 5,847,470 A | 12/1998 | Mitchell | 290/45 |
| 5,873,427 A * | 2/1999 | Ferguson et al. | 180/178 |
| 5,894,730 A | 4/1999 | Mitchell | 60/595 |
| 5,988,041 A | 11/1999 | Hiramatsu et al. | 92/71 |
| 6,062,332 A | 5/2000 | Stephenson et al. | 180/305 |
| 6,085,521 A | 7/2000 | Folsom et al. | 60/490 |
| 6,109,031 A | 8/2000 | Katagiri et al. | 60/431 |
| 6,119,802 A | 9/2000 | Puett | 180/242 |
| 6,135,231 A | 10/2000 | Reed | 180/308 |
| 6,216,670 B1 | 4/2001 | Anderson et al. | 417/269 |
| 6,250,077 B1 | 6/2001 | Iino et al. | 60/436 |
| 6,321,635 B1 | 11/2001 | Fujita | 92/71 |
| 6,381,529 B1 * | 4/2002 | Mistry | 701/51 |
| 6,568,917 B2 | 5/2003 | Fujii et al. | 417/269 |
| 6,616,559 B1 | 9/2003 | Hori et al. | |
| 6,644,936 B1 | 11/2003 | Muta | 417/269 |
| 6,663,354 B2 | 12/2003 | Forster | 417/269 |
| 6,668,549 B2 | 12/2003 | Yano et al. | 60/433 |
| 6,769,392 B2 | 8/2004 | Lawrence et al. | |
| 6,786,704 B2 | 9/2004 | Kamiya et al. | 417/222.2 |
| 6,854,549 B2 * | 2/2005 | Calamari et al. | 180/179 |
| 6,896,088 B2 * | 5/2005 | Dahl et al. | 180/305 |
| 2002/0189886 A1 * | 12/2002 | Zambelli | 180/307 |
| 2003/0173133 A1 * | 9/2003 | Kempt et al. | 180/305 |
| 2004/0074678 A1 * | 4/2004 | Irikura et al. | 180/6.48 |
| 2004/0098984 A1 * | 5/2004 | Duell et al. | 60/431 |

* cited by examiner

DUAL HYDRAULIC MACHINE TRANSMISSION

REFERENCE TO RELATED APPLICATIONS

This is a continuation-in-part patent application of co-pending application Ser. No. 10/789,739, filed Feb. 27, 2004, entitled "LONG-PISTON HYDRAULIC MACHINES", which is a continuation-in-part of application Ser. No. 10/647,557, filed Aug. 25, 2003, entitled "LONG-PISTON HYDRAULIC MACHINES", now abandoned, which was a continuation-in-part of parent patent application Ser. No. 10/229,407, filed Aug. 28, 2002, entitled "LONG-PISTON HYDRAULIC MACHINES", now abandoned. The aforementioned applications are hereby incorporated herein by reference.

The subject matter of this application is also related to the subject matter in co-pending application entitled "ORBITAL TRANSMISSION WITH GEARED OVERDRIVE", filed on the same day as the present application. This application is herein incorporated by reference.

FIELD OF THE INVENTION

This invention relates to hydraulic transmissions used for vehicle locomotion and to liquid hydraulic pump/motor machines appropriate for relatively "heavy duty" automotive use. More particularly, the invention pertains to an all-hydraulic transmission for an automobile.

BACKGROUND OF THE INVENTION

All-hydraulic transmissions are known in the prior art. In U.S. Pat. No. 3,199,286 "HYDROSTATIC DRIVE" to Anderson, issued Aug. 10, 1965, a modular hydraulic drive uses a single pump driving separate motors for each of four wheels to provide step-less acceleration. The hydraulic drive includes control valves at each wheel and recharging of low fluids. In U.S. Pat. No. 3,641,765 "HYDROSTATIC VEHICLE TRANSMISSION" to Hancock et al., issued Feb. 15, 1975, the four-wheel hydrostatic drive has special sets of one-way valves and restrictive connections to permit differentiation and provide traction control between the front and rear axles.

There is a need in the art for a transmission that permits a return to the proven but considerably lower speed engines with reduced torque loss in order to increase gasoline engine vehicle efficiency and reduce the weight and cost of manufacture of cars. There is also a need in the art for a transmission that allows a car to change speeds, while the engine operates at a more constant speed. Although the transmissions in current use in most automobiles require the engine to cycle between low speeds and very high speeds during acceleration, an engine is much more fuel-efficient when running at a constant speed.

All-hydraulic transmissions have been used effectively in slow-moving heavy machinery such as tractors and lightweight vehicles such as golf carts and all-terrain vehicles (ATV's). Although all-hydraulic transmissions have been contemplated for automobiles, the inefficiency of hydraulic transmissions in the prior art has made them impractical for use in automobiles. Scaling a hydraulic transmission of the prior art for use in an automobile would produce an unacceptably large, heavy, and noisy transmission, and such transmissions would be larger, heavier, and noisier than the transmissions currently used in automobiles.

Although an internal combustion engine is the industry standard for automobiles in the United States, several major automobile manufacturers are researching a homogeneous-charge-compression-ignition (HCCI) engine. In a conventional gasoline engine, the air-fuel mixture is ignited by a spark plug to create power. In an HCCI engine, similar to in a diesel engine, a piston compresses the air-fuel mixture to increase its temperature until it ignites. It is estimated that an HCCI engine is capable of a 30% increase in fuel economy over a standard gasoline internal combustion engine. However, a major hurdle for implementation of HCCI technology in automobiles is a difficulty in controlling the combustion both at low and at high engine speeds.

There is a need in the art for a transmission, which provides the necessary power to run an automobile while allowing its engine speed to remain in a relatively narrow low-to-moderate range where the combustion in HCCI engines is more easily controlled. Such a transmission allows implementation of more fuel efficient HCCI engines on gasoline-powered vehicles.

Hydraulic pumps and motors are also well known and widely used, having reciprocating pistons mounted in respective cylinders formed in a cylinder block and positioned circumferentially at a first radial distance about the rotational axis of a drive element. Many of these pump/motor machines have variable displacement capabilities, and they are generally of two basic designs. In the first basic design, the pistons reciprocate in a rotating cylinder block against a variably inclined, but otherwise fixed, swash plate. In the second basic design, the pistons reciprocate in a fixed cylinder block against a variably inclined and rotating swash plate that is often split to include a non-rotating, nutating-only "wobbler" that slides upon the surface of a rotating and nutating rotor. While the invention herein is applicable to both of these designs, it is particularly appropriate for, and is described herein as, an improvement in the latter type of machine in which the pistons reciprocate in a fixed cylinder block.

The pumps and motors utilized in the invention and described herein are liquid-type hydraulic machines and it should be understood that the terms fluid and pressurized fluid as used herein throughout, are intended to identify incompressible liquids rather than compressible gases. Because of the incompressibility of liquids, the pressure and load duty cycles of these two different types of hydraulic machines are so radically different that designs for the gas compression type machines are inappropriate for use in the liquid-type machines, and visa versa. Therefore, the following remarks should all be understood to be directed and applicable to liquid-type hydraulic machines and, primarily, to such heavy-duty automotive applications as those identified above.

Hydraulic machines with fixed cylinder blocks can be built much lighter and smaller than the machines that must support and protect heavy rotating cylinder blocks. However, these lighter machines require rotating and nutating swash plate assemblies that are difficult to mount and support. For high-pressure/high-speed service, the swash plate assembly must be supported in a manner that allows for the relative motion between the heads of the non-rotating pistons and a mating surface of the rotating and nutating swash plate. Such prior art swash plates have often been split into a rotating/nutating rotor portion and a nutating-only wobbler portion, the latter including pockets that mate with the heads of the non-rotating pistons through connecting "dog-bones".

That is, such fixed-cylinder-block machines have heretofore used a "dog-bone" extension rod (i.e., a rod with two spherical ends) to interconnect one end of each piston with the surface of the nutating-but-not-rotating wobbler. One spherical end of the dog-bone is pivotally mounted into the head end of the piston, while the other spherical end is usually held at all times in a pocket of the swash plate wobbler during all relative motions between the heads of the non-rotating pistons and the pockets of the nutating swash plate. As is well known in the art, these relative motions follow varying non-circular paths that occur at all inclinations of the swash plate away from 0°. These dog-bones greatly increase the complexity and cost of building the rotating swash plates of these lighter machines.

Dog-bone rods are also sometimes used to interconnect one end of each piston with the inclined (but not rotating) swash plates of hydraulic machines with rotating cylinder blocks. However, more often this latter type of machine omits such dog-bones, using instead elongated pistons, each having a spherical head at one end (again, usually covered by a pivotally-mounted conventional shoe element) that effectively contacts the non-rotating flat surface of the swash plate. Such elongated pistons are designed so that a significant portion of the axial cylindrical body of each piston remains supported by the walls of its respective cylinder at all times during even the maximum stroke of the piston. This additional support for such elongated pistons is designed to assure minimal lateral displacement of each spherical piston head as it slides over the inclined-but-not-rotating swash plate when the pistons rotate with their cylinder block.

Generally, these elongated pistons are primarily lubricated by "blow-by", i.e., that portion of the high pressure fluid that is forced between the walls of each cylinder and the outer circumference of each piston body as the reciprocating piston drives or is driven by high pressure fluid. Such blow-by provides good lubrication only if tolerances permit the flow of sufficient fluid between the walls of the cylinder and the long cylindrical body of the piston, and blow-by sufficient to assure good lubrication often negatively affects the volumetric efficiency of the pump or motor machine. For instance, a 10 cubic inch machine can use as much as 4 gallons of fluid per minute for blow-by. While smaller tolerances can often be used to reduce blow-by, the reduction of such tolerances is limited by the needs for adequate lubrication that increase with the size of the pressure and duty loads of the machine. Of course, such blow-by is accomplished by using fluid that would otherwise be used to drive or be driven by the pistons to accomplish work. Therefore, in the example just given above, the 4 gallons of fluid per minute used for blow-by lubrication, reduces the volumetric efficiency of the machine.

The invention disclosed below is directed to improving the volumetric efficiency of such elongated-piston machines while, at the same time, assuring appropriate lubrication of the pistons and simplification of the apparatus used to maintain contact between the pistons and the swash plate.

SUMMARY OF THE INVENTION

The modular transmission uses only a pair of small and light hydraulic machines of remarkably improved volumetric efficiency with pistons having body portions substantially as long as the axial length of the respective cylinders in which they reciprocate. The two hydraulic machines operate in a closed loop, one being used as a pump driven by the vehicle's engine, and the other used as a motor. Each machine has a fully articulatable swash plate. By computer control, the angles of the swash plates of the two machines are infinitely varied to provide an appropriate optimum ratio of engine/wheel speed for all conditions from start-up, city driving, hill climbing varied according to load and steepness, and over-drive for highway. This complete vehicle operation is attained while the vehicle's engine continues to operate at relatively constant speeds and relatively low RPM.

The modular transmissions are described using various embodiments of hydraulic machines, all of which share a novel combination of simple structural features including elongated pistons reciprocating in a fixed cylinder block, cylinders provided with unique lubrication recesses, and shoes directly attached to each piston (without dog-bones) that make sliding contact with a rotating and nutating swash plate or, preferably, with the nutating-only wobbler portion of a split swash plate. Testing has verified that these simple structural features have synergistically resulted in a remarkably increased volumetric efficiency and such increased mechanical efficiency that even the drive shafts of machines as large as 12-cubic inch capacity can be easily turned by hand when the machine is fully assembled. Each disclosed machine can operate as either a pump or a motor.

These fixed-cylinder-block hydraulic machines can be built smaller and lighter than conventional rotating block hydraulic machines having similar specifications. With the improved lubrication of their elongated pistons, it is possible to use these smaller and lighter hydraulic machines to meet the high-speed/high-pressure specifications required for automotive use as an infinitely-variable automatic transmission.

Each machine has a fully articulatable swash plate, and by means of a computer program, variations in the angles of the swash plates of the two machines are infinitely varied to provide an appropriate optimum ratio of engine/wheel speed to provide the equivalent of infinitely variable gear ratios for all conditions from start-up, city driving, hill climbing varied according to load and steepness, and over-drive for highway.

DETAILED DESCRIPTION OF THE INVENTION

Figure 1:
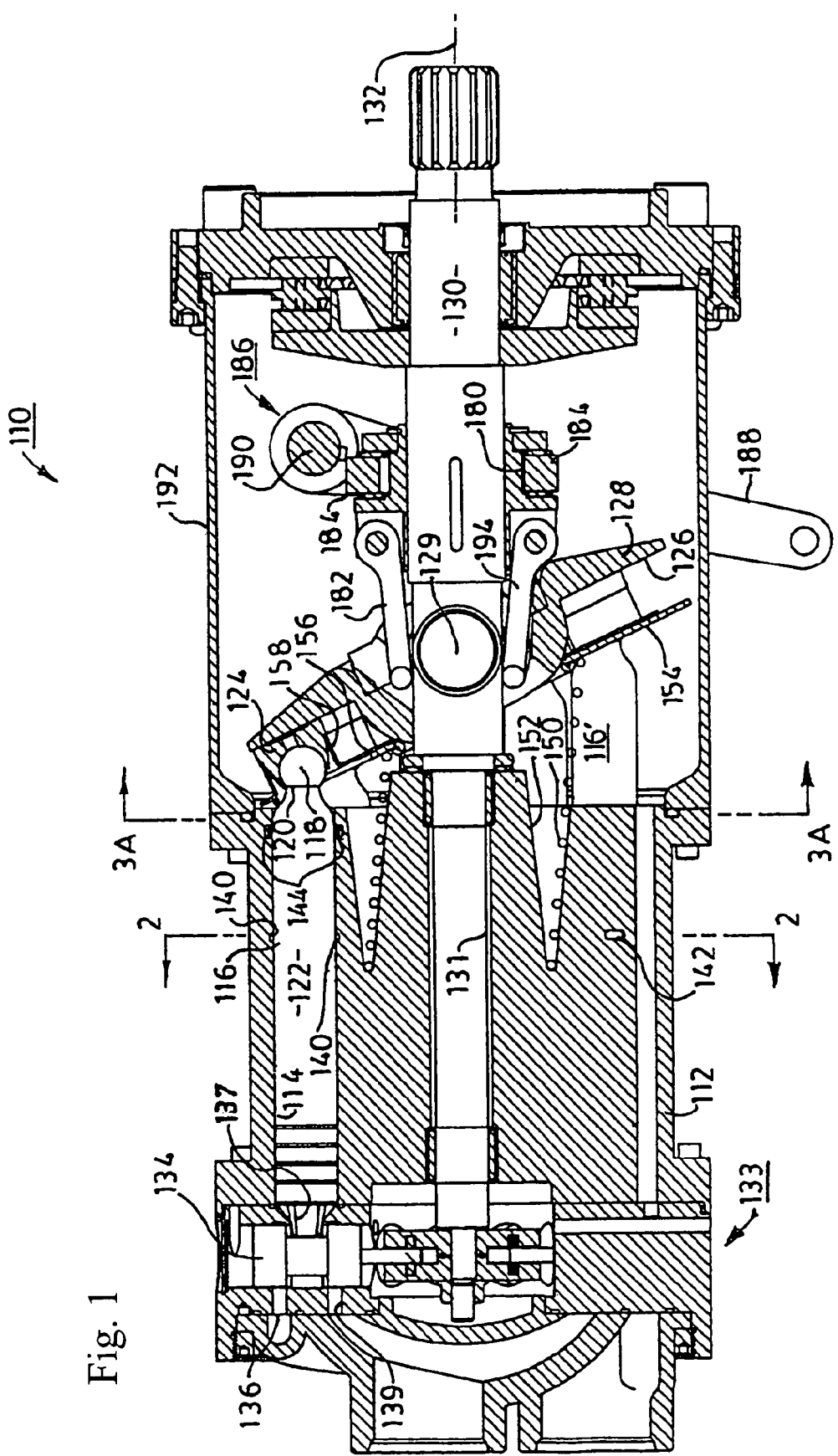
FIG. 1 shows a partially schematic and cross-sectional view of a hydraulic machine with a variable swash plate angle.

Initially, the following key features of the invention are described:

To meet the world's needs for oil conservation while, at the same time, not requiring changes that will cause a significant disturbance in the world's present allocation of fuels, the invention provides an all-hydraulic, gearless, infinitely variable transmission that uses known and tested hydraulic and electronic components.

Since the hydraulics of a transmission of the present invention provide working torque at very low engine RPM's, a gasoline engine vehicle incorporating the present invention in place of the vehicle's original torque converter transmission operates at much lower engine speeds. This feature is due to the remarkable efficiencies that are achieved by using hydraulic machines having stationary cylinder blocks and rotating swash plates that vary through a wide continuum of angles, preferably from −25° to +25°.

A transmission of the present invention is directly coupled without reduction of speed to the engine of a gasoline-powered vehicle. A transmission of the present invention completely replaces the existing transmission of the vehicle, fitting into the same space but having substantially less volume and less weight than the original transmission. No clutches or torque converters are required between the vehicle engine and the present invention, which includes two hydraulic machines operated respectively as a pump and a motor connected in a "closed loop" hydraulic flow. The pump, driven directly by the vehicle's engine, produces a swash plate-controlled flow of hydraulic fluid that is sent directly into the accompanying motor. The motor is directly coupled to the drive shaft for the vehicle's wheels and, by selective positioning of its respective swash plate, produces the torque called for by the driver in reaction to the drive wheel resistance torque.

That is, the inventive transmission fundamentally changes the way the automobile responds to driver inputs. In an automobile with either a manual or automatic geared transmission, when the driver calls for acceleration by pressing on the gas pedal, power is increased to the wheel drive shaft by increasing the speed of the engine. Upon continued acceleration, when the engine reaches a certain high speed, the transmission shifts to a higher gear, either automatically or through the clutch by driver input, and the engine speed drops. With the inventive gearless transmission, when the driver calls for acceleration by pressing on the gas pedal, power is increased by changing the swash plate ratio in the transmission, and the engine speed remains relatively constant. Upon continued acceleration, only when the swash plate ratio reaches a certain value, is the engine speed increased to a new, slightly higher level, to provide the required additional power.

The transmission's electronic controls are remarkably simple. Engine speed and output drive shaft speed are monitored along with fuel consumption and driver's throttle and brake indications, and the only variables that are controlled are the angle of the swash plates in the hydraulic pump/motors and, less often, engine RPM.

With a prototype of the present invention, the hydraulic transmission provided enough power to the wheel drive shaft of a sport utility vehicle (weighing 5575 pounds) to accelerate the automobile rapidly on a dynamometer-simulated flat roadway to 30 MPH while maintaining an engine speed of 860 RPM. This preliminary test operated the vehicle through infinitely variable transmission ratio limits of 25:1 to over 0.67:1. As the automobile accelerates to higher speeds, it is possible to make gradual step increases in the engine speed in order to maximize the time that the engine is maintained at constant speeds and improve fuel efficiency. The prototype hydraulic transmission was capable of providing enough power to accelerate the automobile to highway speeds while never increasing engine speed beyond 2200 RPM. Also, the inventive transmission was able to start up and maintain a stable vehicle speed at 2 RPM (i.e., a speed of only 16 feet per minute), and it achieved acceleration rates peaking greater than 10 MPH/second with a 50% reduction in fuel consumption during such acceleration as measured by positive displacement flow meters. Further, satisfactory deceleration was achieved at 20 MPH/second to bring the vehicle to a complete stop without using the vehicle's brakes.

A transmission of the present invention is capable of varying the speed of the drive shaft with minimal changes to engine speed. Thus, the present invention allows engine speed to remain in a relatively narrow low-to-moderate range where the combustion in recently proposed HCCI engines is predicted to be more easily controlled. A transmission of the present invention is highly compatible with implementation of more fuel efficient HCCI engines on gasoline-powered vehicles.

Further, the present invention opens the possibility of the auto industry being able to return to proven lower speed/higher torque engines, allowing even greater efficiency improvements to be achieved with lighter, lower cost engines.

While the operation of hydraulic machines of the type that may used to create the hydraulic portion of the inventive transmission are well known, a preferred pair of such hydraulic machines will next be described in some detail. As indicated above, it can be assumed that each disclosed machine is connected in a well known "closed loop" hydraulic system with an appropriately mated pump or motor. Both hydraulic machines in the transmission of the present invention are preferably identical in structure, one being used as a pump and the other as a motor.

In a preferred embodiment, a transmission of the present invention is used in combination with an accumulator to improve fuel economy.

Long-Piston Hydraulic Machine

Referring to FIG. 1, a variable hydraulic machine 110 includes a modular fixed cylinder block 112. Cylinder block 112 has a plurality of cylinders 114 (only one shown) in which a respective plurality of mating pistons 116 reciprocate between the retracted position of piston 116 and variable extended positions (the maximum extension being shown in the position of piston 116'). Each piston has a spherical head 118 that is mounted on a neck 120 at one end of an elongated axial cylindrical body portion 122 that is substantially as long as the length of each respective cylinder 114. Each spherical piston head 118 fits within a respective shoe 124 that slides over a flat face 126 formed on the surface of a rotor 128 that is pivotally attached to a drive element, namely, shaft 130 that is supported on bearings within a bore in the center of cylinder block 112.

Hydraulic machine 110 is provided with a modular valve assembly 133 that is bolted as a cap on the left end of modular cylinder block 112 and includes a plurality of spool valves 134 (only one shown) that regulate the delivery of fluid into and out of cylinders 114.

The machine 110 can be operated as either a pump or as a motor. For operation as a motor, during the first half of each revolution of drive shaft 130, high pressure fluid from an inlet 136 enters the valve end of each respective cylinder 114 through a port 137 to drive each respective piston from its retracted position to its fully extended position. During the second half of each revolution, lower pressure fluid is withdrawn from each respective cylinder through port 137 and fluid outlet 139 as each piston returns to its fully retracted position.

For operation as a pump, during the one half of each revolution of drive shaft 130, lower pressure fluid is drawn into each respective cylinder 114 entering a port 137 from a "closed loop" of circulating hydraulic fluid through inlet 136 as each piston 116 is moved to an extended position. During the next half of each revolution, the driving of each respective piston 116 back to its fully retracted position directs high pressure fluid from port 137 into the closed hydraulic loop through outlet 139. The high pressure fluid is then delivered through appropriate closed loop piping (not shown) to a mating hydraulic machine, e.g., hydraulic machine 110 discussed above, causing the pistons of the mating machine to move at a speed that varies with the volume (gallons per minute) of high pressure fluid being delivered in a manner well known in the art.

The cylindrical wall of each cylinder 114 in modular cylinder block 112 is transected radially by a respective lubricating channel 140 formed circumferentially therein. A plurality of passageways 142 interconnect all lubricating channels 140 to form a continuous lubricating passageway in cylinder block 112.

Each respective lubricating channel 140 is substantially closed by the axial cylindrical body 122 of each respective piston 116 during the entire stroke of each piston. That is, the outer circumference of each cylindrical body 122 acts as a wall that encloses each respective lubricating channel 140 at all times. Thus, even when pistons 116 are reciprocating through maximum strokes, the continuous lubricating passageway interconnecting all lubricating channels 140 remains substantially closed off. Continuous lubricating passageway 140, 142 is simply and economically formed within cylinder block 112.

During operation of hydraulic machine 110, all interconnected lubricating channels 140 are filled almost instantly by a minimal flow of high-pressure fluid from inlet 136 entering each cylinder 114 through port 137 and being forced between the walls of the cylinders and the outer circumference of each piston 116. Loss of lubricating fluid from each lubricating channel 140 is restricted by a surrounding seal 144 located near the open end of each cylinder 114. Nonetheless, the lubricating fluid in this closed continuous lubricating passageway of lubricating channels 140 flows moderately but continuously as the result of a continuous minimal flow of fluid between each of the respective cylindrical walls of each cylinder and the axial cylindrical body of each respective piston in response to piston motion and to the changing pressures in each half-cycle of rotation of drive shaft 130 as the pistons reciprocate. As the pressure in each cylinder 114 is reduced to low pressure on the return stroke of each piston 116, the higher pressure fluid in otherwise closed lubricating passageway 140, 142 is again driven between the walls of each cylinder 114 and the outer circumference of body portion 122 of each piston 116 into the valve end of each cylinder 114 experiencing such pressure reduction.

The flow of lubricating fluid in closed continuous lubricating passageway 140, 142 is moderate but continuous as the result of a secondary minimal fluid flow in response to piston motion and to the changing pressures in each half-cycle of rotation of drive shaft 130 as the pistons reciprocate.

Rotor 128 of pump 110 is pivotally mounted to drive shaft 130 about an axis 129 that is perpendicular to axis 132. Therefore, while rotor 128 rotates with drive shaft 130, its angle of inclination relative to axis 130 is preferably variable from 0° (i.e., perpendicular) to ±25°. In FIG. 1, rotor 128 is inclined at +25°. This variable inclination is controlled as follows: The pivoting of rotor 128 about axis 129 is determined by the position of a sliding collar 180 that surrounds drive shaft 130, and is movable axially relative thereto. A control link 182 connects collar 180 with rotor 128 so that movement of collar 180 axially over the surface of drive shaft 130 causes rotor 128 to pivot about axis 129. For instance, as collar 180 is moved to the right in FIG. 1, the inclination of rotor 128 varies throughout a continuum from the +25° inclination shown, back to 0° (i.e., perpendicular), and then to −25°.

The axial movement of collar 180 is controlled by the fingers 184 of a yoke 186 as yoke 186 is rotated about the axis of a yoke shaft 190 by articulation of a yoke control arm 188. Yoke 186 is actuated by a conventional linear servo-mechanism (not shown) connected to the bottom of yoke arm 188. While the remaining elements of yoke 186 are all enclosed within a modular swash plate housing 192, and yoke shaft 190 is supported in bearings fixed to housing 192, yoke control arm 188 is positioned external of housing 192. Swash plate rotor 128 is balanced by a shadow link 194 that is substantially identical to control link 182 and is similarly connected to collar 180 but at a location on exactly the opposite side of collar 180.

Figure 2:
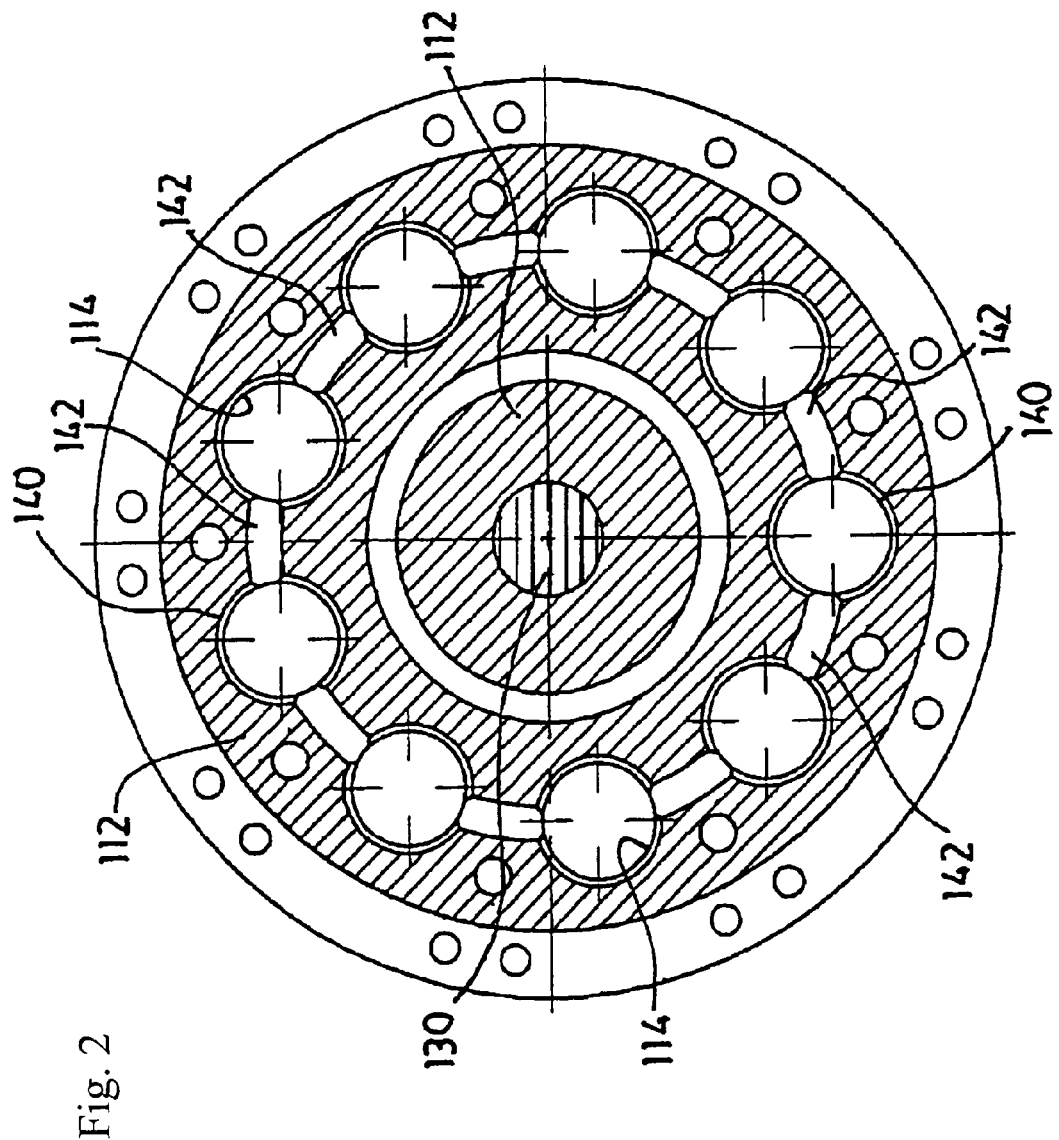
FIG. 2 shows a partially schematic and cross-sectional view of the hydraulic machine of FIG. 1 taken along the plane 2-2 with parts being omitted for clarity.

Referring to both FIG. 1 and FIG. 2, the cylindrical wall of each cylinder 114 is transected radially by a respective lubricating channel 140 formed circumferentially therein. A plurality of passageways 142 interconnect all lubricating channels 140 to form a continuous lubricating passageway in cylinder block 112. Each respective lubricating channel 140 is substantially closed by the axial cylindrical body 122 of each respective piston 116 during the entire stroke of each piston. That is, the outer circumference of each cylindrical body 122 acts as a wall that encloses each respective lubricating channel 140 at all times. Thus, even when pistons 116 are reciprocating through maximum strokes, the continuous lubricating passageway interconnecting all lubricating channels 140 remains substantially closed off. Continuous lubricating passageway 140, 142 is simply and economically formed within cylinder block 112 as can be best appreciated from the schematic illustration in FIG. 2 in which the relative size of the fluid channels and connecting passageways and has been exaggerated for clarification.

During operation of hydraulic machine 110, all interconnected lubricating channels 40 are filled almost instantly by a minimal flow of high-pressure fluid from inlet 36 entering each cylinder 114 through port 137 and being forced between the walls of the cylinders and the outer circumference of each piston 116. Loss of lubricating fluid from each lubricating channel 140 is restricted by a surrounding seal 144 located near the open end of each cylinder 114. Nonetheless, the lubricating fluid in this closed continuous lubricating passageway of lubricating channels 140 flows moderately but continuously as the result of a continuous minimal flow of fluid between each of the respective cylindrical walls of each cylinder and the axial cylindrical body of each respective piston in response to piston motion and to the changing pressures in each half-cycle of rotation of drive shaft 130 as the pistons reciprocate. As the pressure in each cylinder 114 is reduced to low pressure on the return stroke of each piston 116, the higher pressure fluid in otherwise closed lubricating passageway 140, 142 is again driven between the walls of each cylinder 114 and the outer circumference of body portion 122 of each piston 116 into the valve end of each cylinder 114 experiencing such pressure reduction.

Figure 3:
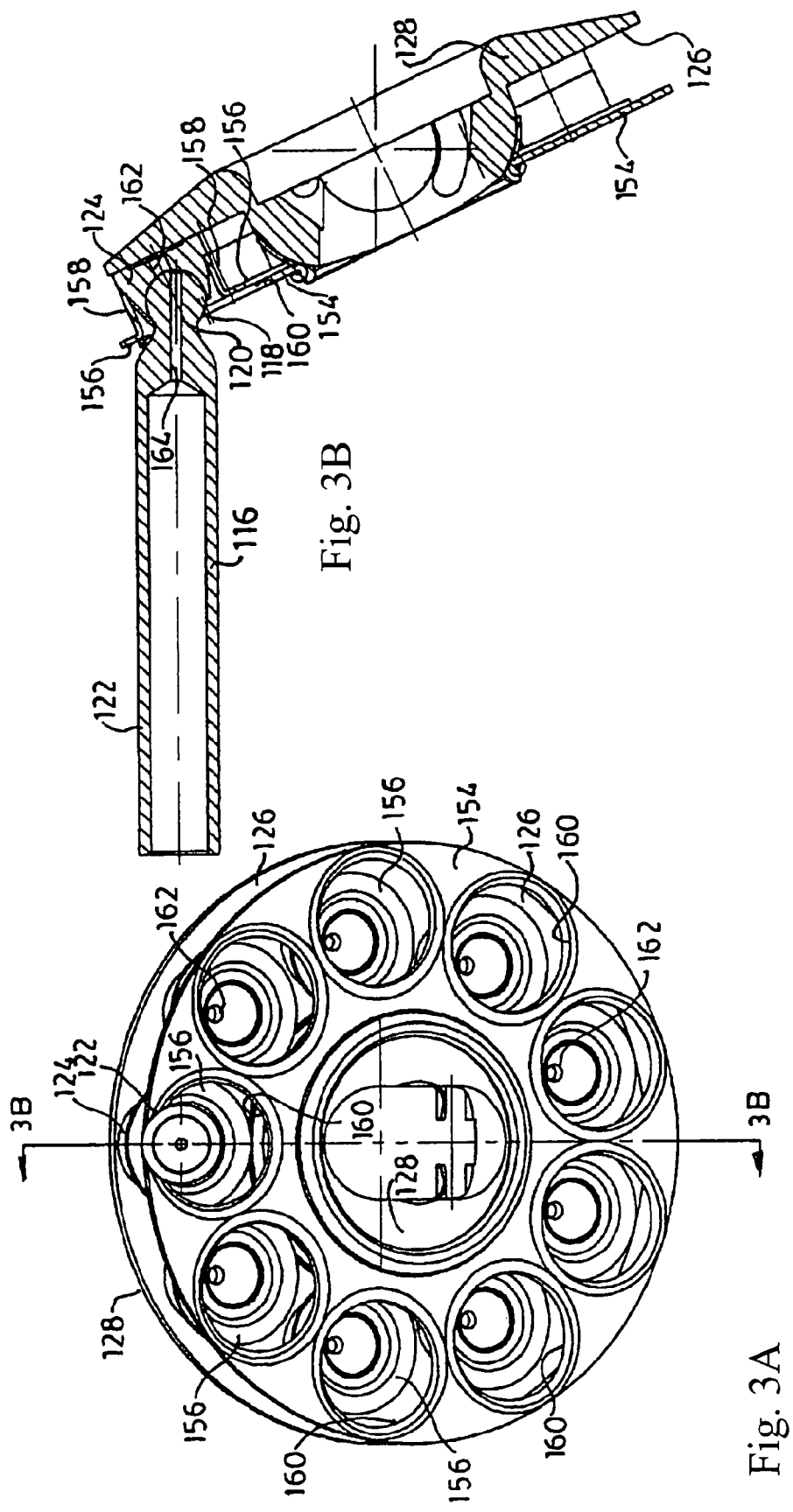
FIG. 3A shows a partially schematic view of a hold-down plate, when the swash plate is inclined at +25°, as seen from the plane 3A-3A of FIG. 1.
FIG. 3B shows a partially cross-sectional view of the swash plate and piston hold-down assembly, the view being taken in the plane 3B-3B of FIG. 3A.

Referring to FIG. 3A and FIG. 3B, a hold-down assembly for a hydraulic machine includes a hold-down element 154 with a plurality of circular openings 160, each of which surrounds the neck 120 of a respective piston 116. The swash plate is at +25° angle in FIG. 3A and FIG. 3B. FIG. 3A shows the hold-down plate 154 from the perspective of looking down the shaft of the rotor 128, or from plane 3A-3A of FIG. 1. A plurality of special washers 156 is positioned, respectively, between hold-down element 154 and each piston shoe 124. Each washer 156 has an extension 158 that contacts the outer circumference of a respective shoe 124 to maintain the shoe in contact with flat face 126 of rotor 128 at all times. Each respective shoe cavity is connected through an appropriate shoe channel 162 and piston channel 164 to assure that fluid pressure present at the shoe-rotor interface is equivalent at all times with fluid pressure at the head of each piston 116.

Fluid pressure constantly biases pistons 116 in the direction of rotor 128, and the illustrated thrust plate assembly is provided to carry that load. However, at the speeds of operation required for automotive use (e.g., 4000 rpm) additional bias loading is necessary to assure constant contact between piston shoes 124 and flat surface 126 of rotor 128. The variable hydraulic machines provide such additional bias by using one of three simple spring-biased hold-down assemblies.

The first hold-down assembly, for hydraulic machine 110, includes a coil spring 150 that is positioned about shaft 130 and received in an appropriate crevice 152 formed in cylinder block 112 circumferentially about axis 132. Coil spring 150 biases a hold-down element 154 that is also positioned circumferentially about shaft 130 and axis 132. Hold-down element 154 is provided with a plurality of circular openings 160, each of which surrounds the neck 120 of a respective piston 116. A plurality of special washers 156 is positioned, respectively, between hold-down element 154 and each piston shoe 124. Each washer 156 has an extension 158 that contacts the outer circumference of a respective shoe 124 to maintain the shoe in contact with flat face 126 of rotor 128 at all times.

The positions of the swash plate and piston shoe hold-down assembly change relative to each other, as the inclination of rotor 128 is altered during machine operation. Referring to the relative position of these parts at 0° inclination, each piston channel 164 has the same radial position relative to each respective circular opening 160 in hold-down element 154. At all inclinations other than 0°, the relative radial position of each piston channel 164 is different for each opening 160, and the relative positions of each special washer 156 is also different. The different relative positions at each of the nine openings 160 are themselves constantly-changing as rotor 128 rotates and nutates through one complete revolution at each inclination. For instance, at the 25° inclination shown in FIG. 3A, if during each revolution of rotor 128, one were to watch the movement occurring through only the opening 160 at the top (i.e., at 12 o'clock) of hold-down element 154, the relative position of the parts viewed in the top opening 160 would serially change to match the relative positions shown in each of the other eight openings 160.

At inclinations other than 0°, during each revolution of rotor 128, each special washer 156 slips over the surface of hold-down element 154 as, simultaneously, each shoe 124 slips over the flat face 126 of rotor 128. Each of these parts changes relative to its own opening 160 through each of the various positions that can be seen in each of the other eight openings 160. Each follows a cyclical path (that appears to trace a lemniscate, i.e., a "figure-eight") that varies in size with the angular inclination of swash plate rotor 128 and the horizontal position of each piston 116 in fixed cylinder block 112. To assure proper contact between each respective shoe 124 and flat surface 126 of rotor 128, a size is preferably selected for the boundaries of each opening 160 so that the borders of opening 160 remain in contact with more than one-half of the surface of each special washer 156 at all times during each revolution for all inclinations of rotor 128.

Figure 4:
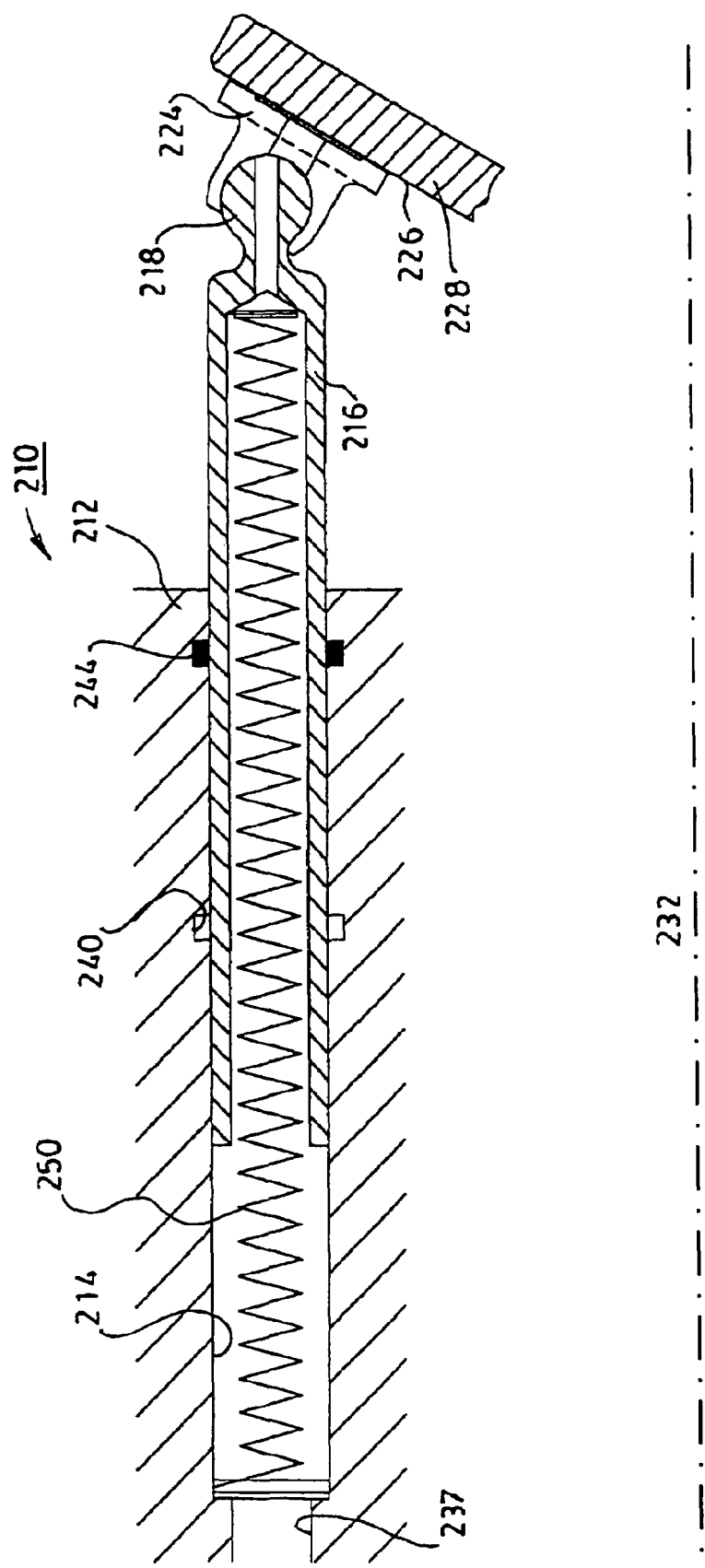
FIG. 4 shows a cross-sectional view of a single cylinder with a long spring.

A second hold-down assembly is shown schematically in FIG. 4 in an enlarged, partial, and cross-sectional view of a single piston of a hydraulic machine 210. Each piston 216 is positioned in the modular fixed cylinder block 212 within a cylinder 214, the latter being transected radially by a respective lubricating channel 240 formed circumferentially therein. In the same manner as described in relation to the other hydraulic machines already detailed above, each lubricating channel 240 is interconnected with similar channels in the machine's other cylinders to form a continuous lubricating passageway in cylinder block 212. An optional surrounding seal 244 may be located near the open end of each cylinder 214 to minimize further the loss of lubricating fluid from each lubricating channel 240.

Fixed cylinder block 212 includes neither a large axially circumferential coil spring nor an axially circumferential crevice for holding same. The modular fixed cylinder block 212 of hydraulic machine 210 can be connected to either a modular fixed-angle swash plate assembly or a modular variable-angle swash plate assembly, but in either case, hydraulic machine 210 provides a much simpler hold-down assembly. Namely, the hold-down assembly of this embodiment includes only a respective conventional piston shoe 224 for each piston 216 in combination with only a respective coil spring 250, the latter also being associated with each respective piston 216.

Each piston shoe 224 is similar to the conventional shoes shown in the first hold-down assembly and is mounted on the spherical head 218 of piston 216 to slide over the flat face 226 formed on the surface of the machine's swash plate rotor 228. Each coil spring 250 is, respectively, seated circumferentially about hydraulic valve port 237 at the valve end of each respective cylinder 214 and positioned within the body portion of each respective piston 216.

Each shoe 224 slips over flat face 226 of rotor 228 with a lemniscate motion that varies in size with the horizontal position of each piston 216 and the inclination of rotor 228 relative to axis 232. During normal operation of hydraulic machine 210, shoes 224 are maintained in contact with flat face 226 of the swash plate by hydraulic pressure. Therefore, the spring bias provided by coil springs 250 is minimal but sufficient to maintain effective sliding contact between each shoe 224 and flat face 226 in the absence of hydraulic pressure at the valve end of each respective cylinder 214. The minimal bias of springs 250 not only facilitates assembly but also prevents entrapment of tiny dirt and metal detritus encountered during assembly and occasioned by wear.

Figure 5:
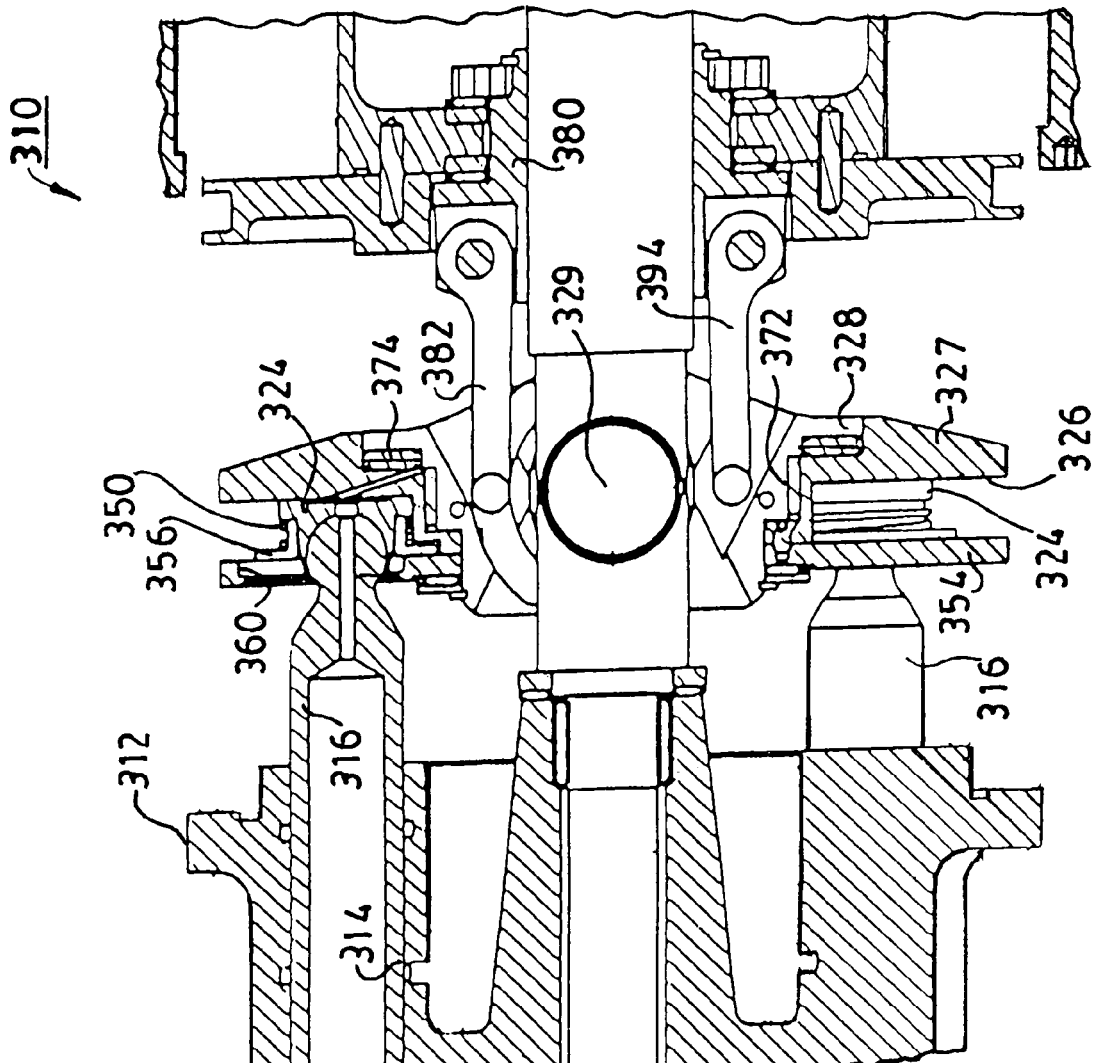
FIG. 5 shows a partially schematic and cross-sectional view of a hydraulic machine with a split swash plate.

Referring to FIG. 5, a third hold-down assembly for a hydraulic machine 310 includes an improved conventional split swash plate arrangement. A plurality of pistons 316, each including a respective sliding shoe 324, reciprocates in respective cylinders 314 formed in cylinder block 312 that is identical to cylinder block 112. Each shoe 324 slides on the flat face 326 formed on a wobbler 327 that is mounted on a mating rotor 328 by appropriate bearings 372, 374 that permit wobbler 327 to nutate without rotation while rotor 328 both nutates and rotates in a manner well known in the art. The inclination of wobbler 327 and rotor 328 about axis 329 is controlled by the position of a sliding collar 380, a control link 382, and a balancing shadow link 394.

Shoes 324 are held down by a hold-down assembly substantially identical to the first hold-down assembly, however, the large single coil spring 150 is replaced by a plurality of smaller individual coil springs.

A hold-down plate 354 is fixed to wobbler 327. Each shoe 324 receives the circumferential extension of a respective special washer 356, and the neck of each piston 316 is positioned within one of a corresponding plurality of respective openings 360 formed through hold-down plate 354. While wobbler 327 does not rotate with rotor 328, the nutational movement of wobbler 327 is identical to the nutational movement of rotor 328 and, therefore, the relative motions between shoes 324 and the flat surface 326 of wobbler 327 are also identical to those in the first hold-down assembly.

A plurality of individual coil springs 350 provides the minimal spring bias to maintain effective sliding contact between each shoe 324 and flat face 326 of wobbler 327 in the absence of hydraulic pressure at the valve end of each cylinder 314. Each coil spring 350 is positioned circumferentially about each shoe 324, being captured between each special washer 356 and a collar formed just above the bottom of each shoe 324.

Figure 6:
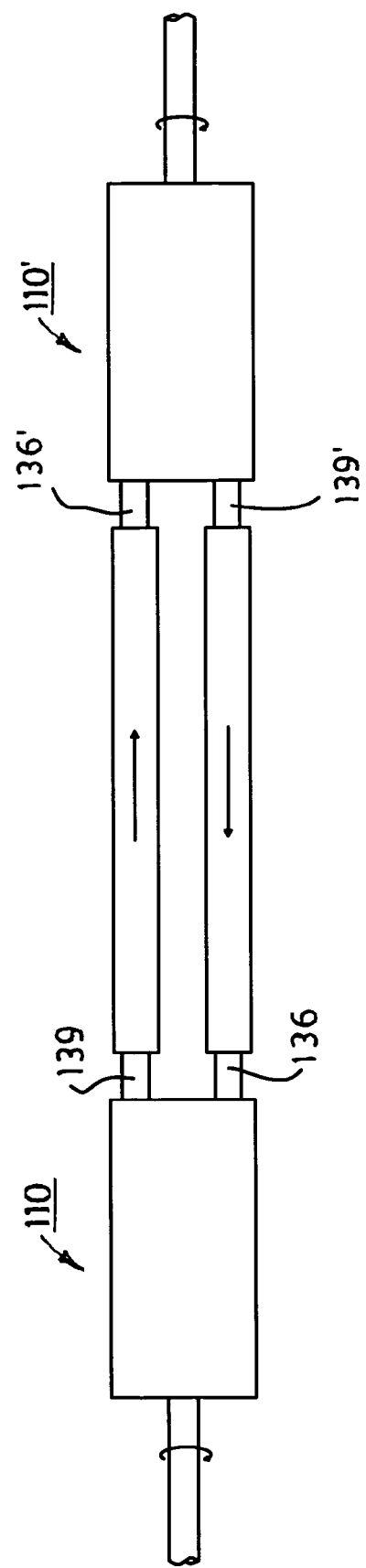
FIG. 6 shows a view of a "closed loop" arrangement of two hydraulic machines as known in the prior art.

Referring to FIG. 6, each hydraulic machine, whether a motor or a pump, is preferably paired with another hydraulic machine, a mating pump or motor, in a well known "closed loop" arrangement. For example, the high-pressure fluid exiting from the outlet 139 of hydraulic machine 110 is directly delivered to the input 136' of a mating hydraulic machine 110', while the low-pressure fluid exiting from the outlet 139' of hydraulic machine 110' is directly delivered to the input 136 of mating hydraulic machine 110. Hydraulic machine 110 and hydraulic machine 110' may be identical in structure except that hydraulic machine 110 is used as a pump and hydraulic machine 110' is used as a motor. A portion of the fluid in this closed loop system is continually lost to "blow-by" and is collected in a sump, and fluid is automatically delivered from the sump back into the closed loop to maintain a predetermined volume of fluid in the closed loop system at all times.

Hydraulic Transmission

Figure 7A:
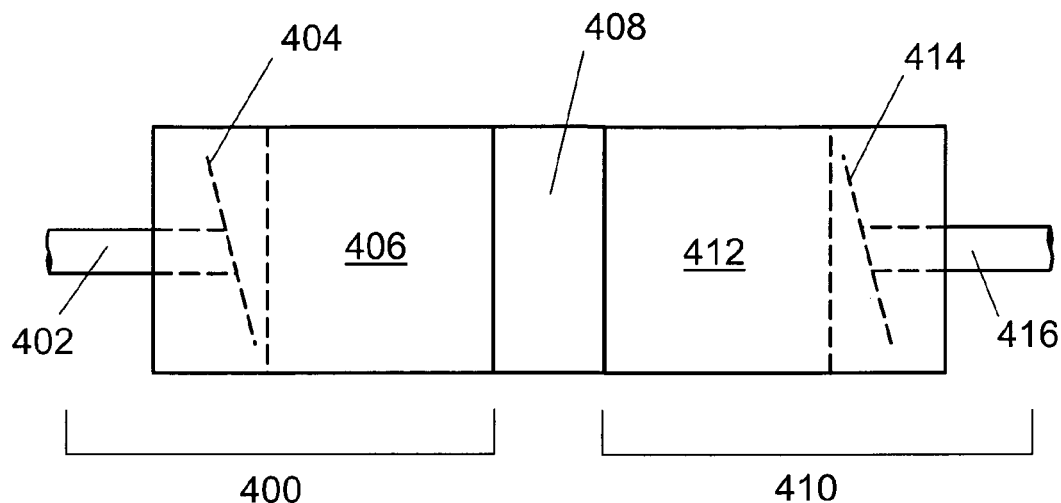
FIG. 7A shows a schematic view of a pump and motor combined in an end-to-end embodiment of a hydraulic module of the inventive transmission.
Figure 7B:
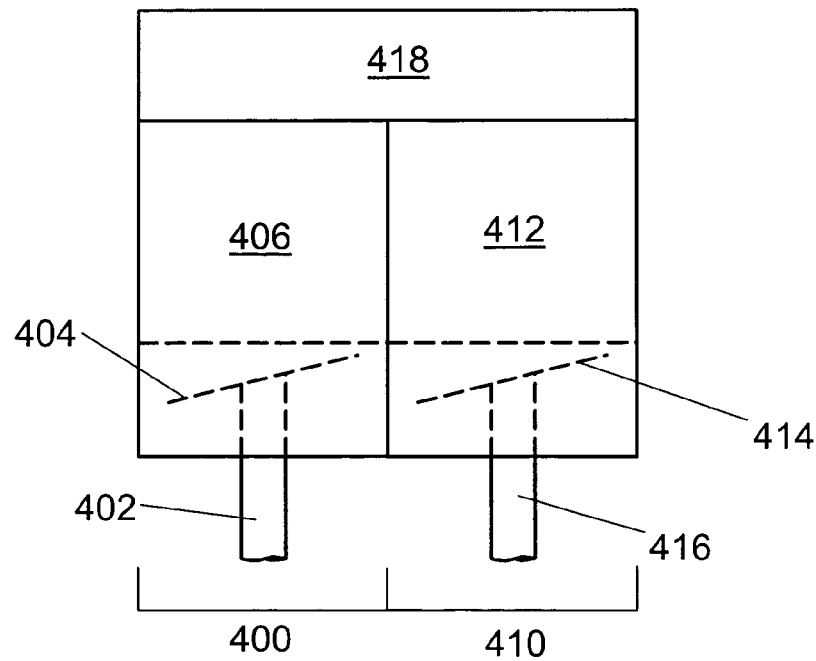
FIG. 7B shows a schematic view of the same pump and motor combined in a side-by-side embodiment to form another hydraulic module of the inventive transmission.

In one embodiment, the dual hydraulic machines are arranged end-to-end, as shown in FIG. 7A, and in another embodiment the dual hydraulic machines are arranged side-by-side, as shown in FIG. 7B. In the end-to-end embodiment, the pump 400 includes a pump shaft 402 driving the pump swash plate 404, which drives the long pistons in the pump cylinder block 406. A hydraulic circuit 408 connects pump 400 to the motor 410. Hydraulic circuit 408 provides fluid communication between pump cylinder block 406 and the motor cylinder block 412. Pressurized hydraulic fluid from pump 400 drives the motor pistons, which drive the motor swash plate 414 to turn the motor drive shaft 416. In the side-by-side embodiment, the hydraulic circuit 418 is reconfigured to connect the two cylinder blocks 406, 412, which sit next to each other. In this embodiment, pump 400 and motor 410 may be structurally connected along their common side to provide stability to the pump-motor unit.

While the end-to-end arrangement is simpler and lighter, requiring fewer parts to connect the pump to the motor, the side-by-side arrangement is significantly shorter in length. An end-to-end 12-cubic inch prototype is 25 inches in length and 10 inches in diameter and weighs 150 pounds. A side-by-side 12-cubic inch prototype is 17 inches in length and 20 inches across. Both prototypes pump 12 cubic inches of pressurized liquid per revolution at full pump swash. Both prototypes are so efficient that very little energy is lost as heat. Throughout operation, the cylinder block remains comparatively cool to prior art hydraulic machines. Both prototypes are remarkably quiet during operation as well.

As indicated earlier, the transmission's electronic controls are remarkably simple. Engine speed, working fluid pressure, and output drive shaft speed are monitored along with fuel consumption and the driver's throttle and brake indications, and the only variables that are controlled are engine RPM and the angles of the swash plates in the hydraulic pump and hydraulic motor. Further, after reaching highway speeds, the motor swash plate is varied to provide a continuously variable overdrive from 1:1 through about 0.5:1.

In an embodiment of the present invention, the hydraulic transmission is modular. The term "modular", as used herein, is specifically intended to describe a unit that can be used "as is" to replace the existing transmission of a presently operating or designed vehicle. A modular transmission according to the present invention makes it possible to allow a present gasoline engine vehicle to operate with an increase in fuel efficiency comparable to what could be achieved by a similarly sized diesel engine vehicle.

Figure 8A:
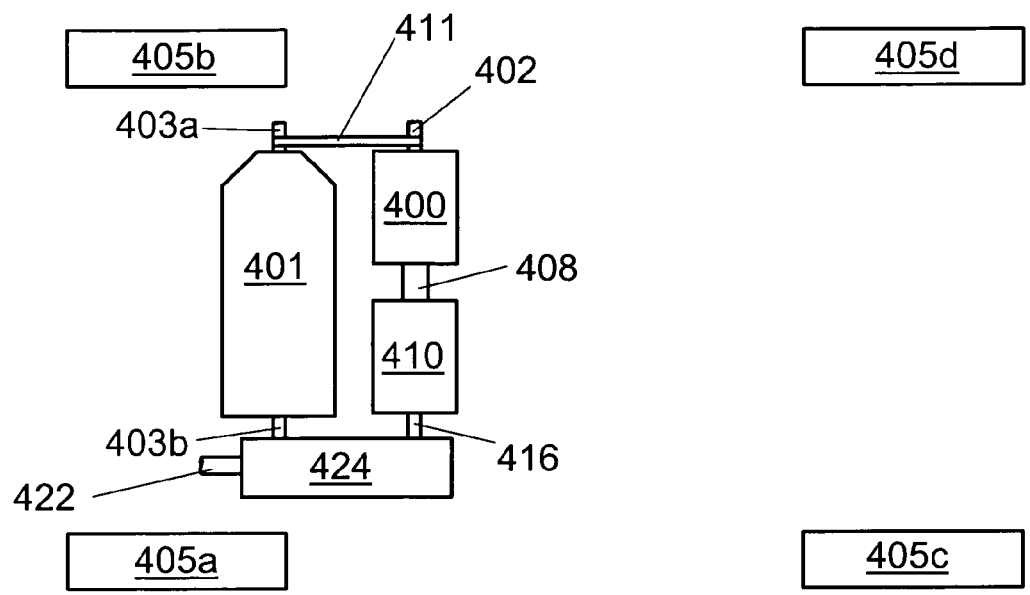
FIG. 8A shows a schematic and relatively to scale representation of the hydraulic module of FIG. 7A, showing it being used as a transmission in a front-wheel-drive vehicle.

FIG. 8A is a schematic, and relatively to scale, illustration of a front-wheel-drive automobile, showing the "east-west" engine 401 located between the front tires 405a, 405b and in front of the rear tires 405c, 405d. The vehicle's transmission has been removed and replaced with the end-to-end modular embodiment of the invention illustrated in FIG. 7A, namely, hydraulic pump 400 is connected to hydraulic motor 410 through hydraulic circuit 408. This module is shown in one possible position relative to engine 401, with pump shaft 402 being connected by a belt 411 to the auxiliary component drive shaft 403a of engine 401. A connection mechanism 424 connects the output of the hydraulic module from motor drive shaft 416 to the front wheel drive shaft 422.

Preferably, the output is connected to the vehicle's front wheels through the same mechanism that received the output of the vehicle's original transmission. In one embodiment, connection mechanism 424 is a mechanical coupling of only motor output shaft 416 to front wheel drive shaft 422. In another embodiment, connection mechanism 424 involves mechanically combining motor output 416 with engine output 403b to provide power to front wheel drive shaft 422. In both embodiments, the power supplied to wheel drive shaft 422 is varied primarily by varying the hydraulic settings to vary the output of the hydraulic module. In both embodiments, the power supplied to wheel drive shaft 422 may be varied secondarily by varying the speed of engine 401. In the second embodiment, connection mechanism 424 may include a single orbiter to combine the power output from motor shaft 416 with the output from engine drive shaft 403b.

Figure 8B:
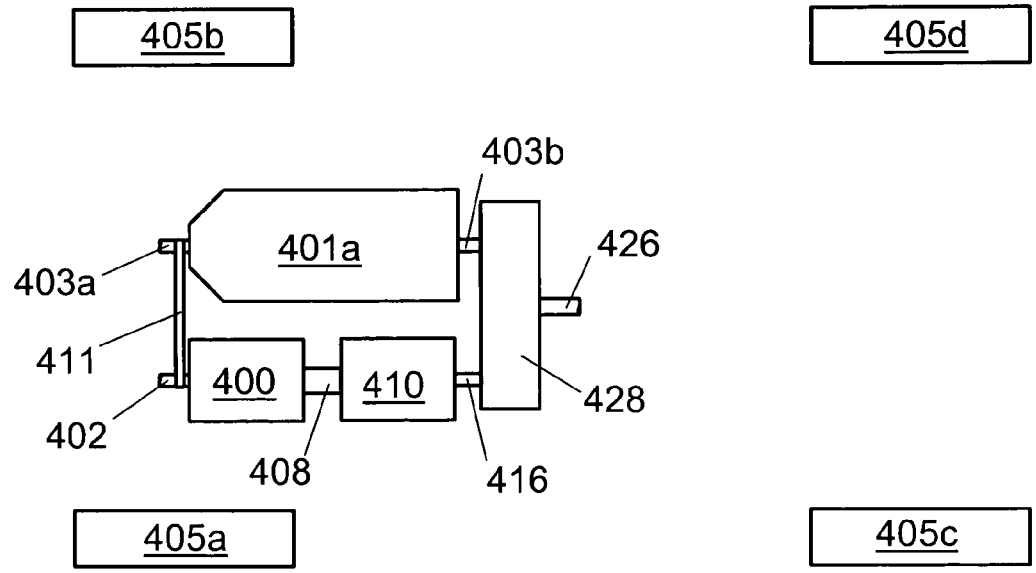
FIG. 8B shows a schematic and relatively to scale representation of the hydraulic module of FIG. 7A, showing it being used as a transmission in a rear-wheel-drive vehicle.

FIG. 8B is a schematic, and relatively to scale, illustration of a rear-wheel-drive automobile, showing the "north-south" engine 401a located between the front tires 405a, 405b. The vehicle's transmission has been removed and replaced with the end-to-end modular embodiment of the invention illustrated in FIG. 7A, namely, hydraulic pump 400 is connected to hydraulic motor 410 through hydraulic circuit 408. This module is shown in one possible position relative to engine 401, with pump shaft 402 being connected by a belt 411 to the auxiliary component drive shaft 403a of engine 401. A connection mechanism 428 connects the output of the hydraulic module from motor drive shaft 416 to the rear wheel drive shaft 426.

Preferably, the output is connected to the vehicle's rear wheels through the same mechanism that received the output of the vehicle's original transmission. In one embodiment, connection mechanism 428 is a mechanical coupling of only motor output shaft 416 to rear wheel drive shaft 426. In another embodiment, connection mechanism 428 involves mechanically combining motor output 416 with engine output 403b to provide power to rear wheel drive shaft 426. In both embodiments, the power supplied to wheel drive shaft 426 is varied primarily by varying the hydraulic settings to vary the output of the hydraulic module. In both embodiments, the power supplied to wheel drive shaft 426 may be varied secondarily by varying the speed of engine 401. In the second embodiment, connection mechanism 428 may include a single orbiter to combine the power output from motor shaft 416 with the output from engine drive shaft 403b.

Figure 9A:
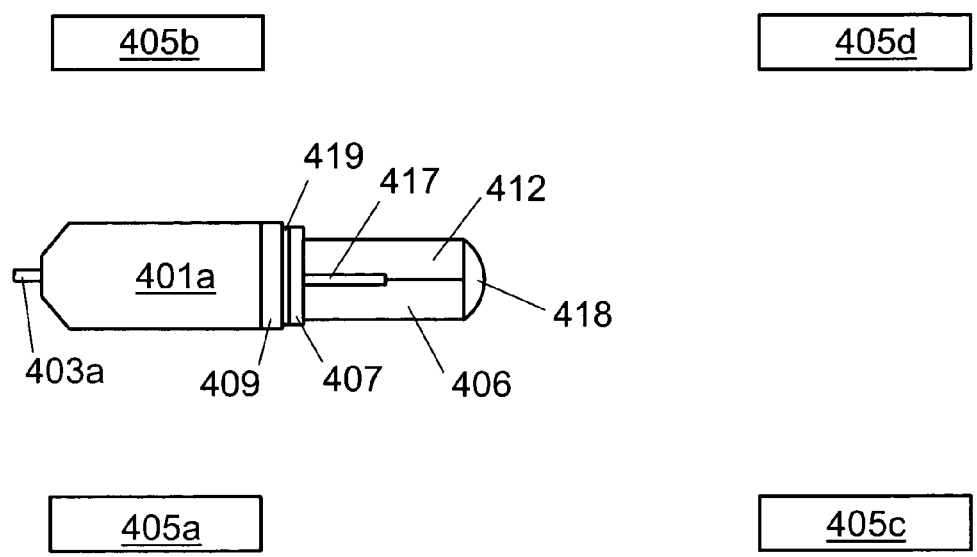
FIG. 9A is a schematic and relatively to scale top view of the hydraulic module of FIG. 7B, showing it being used as a transmission in a more conventional rear-wheel-drive vehicle.
Figure 9B:
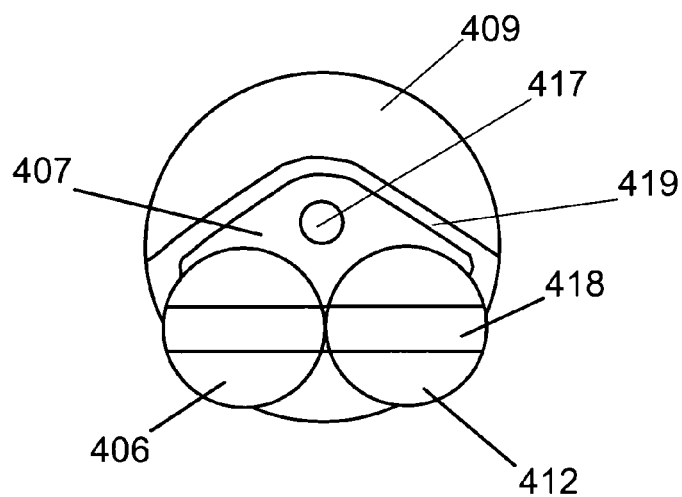
FIG. 9B is a schematic and relatively to scale end view of the hydraulic module of FIG. 9A.

Similarly, FIG. 9A and FIG. 9B are schematic, and relatively to scale, top and end view illustrations of the front end of a conventional rear-wheel-drive vehicle, showing a conventional "north-south" engine 401a located between the vehicle's front tires 405c, 405d. Again, the vehicle's transmission has been removed and replaced, but in this instance with the side-by-side modular embodiment of the invention illustrated in FIG. 7B. While hydraulic pump 400 is still connected to hydraulic motor 410 through hydraulic circuit 408 at the rear of the module, the front of the module includes a connection box 407 with a mounting plate 419. The module is bolted to the fly-wheel casing 409 at the rear of engine 401a. The pump shaft of hydraulic pump 400 is connected by conventional means to the main drive shaft of engine 401a (not shown), and the output of the hydraulic module is also connected by conventional means (not shown) within connection box 407 to an output shaft 417 that connects to the vehicle's wheels through the same mechanism that received the output of the vehicle's original transmission. In the second embodiment, connection box 407 may include a single orbiter to combine the power output from motor shaft 402 (see FIG. 7B) with the output from the engine drive shaft.

Vehicle Operation

The vehicle engine operation is started in a conventional manner, with the vehicle's shift lever in "Park". (NOTE: The vehicle's shift lever is hereinafter referred to as the "drive mode selector".) When the engine is running normally at idle, e.g., approximately 750 RPM and the vehicle is still in "Park", the transmission and its computer controller are in standby mode. The engine can be raced in neutral by operation of the gas pedal. As soon as the drive mode selector is moved out of "Park", the computer controller begins controlling both engine speed and vehicle speed based on the following real-time inputs:
 a) position of the drive mode selector
 b) position of the accelerator pedal
 c) position of the brake pedal
 d) vehicle speed based on engine output shaft and wheel drive shaft speeds
 e) fuel flow rate to the engine
 f) positions of the swash plates on the pump-motors
 g) hydraulic circuit pressure.

The computer controller uses these inputs to produce real-time outputs to the following components:

a) high-pressure hydraulic safety valves on the pump-motors
 b) swash plate servo position valves on the pump-motors
 c) engine throttle to adjust to an optimum engine speed.

Figure 10:
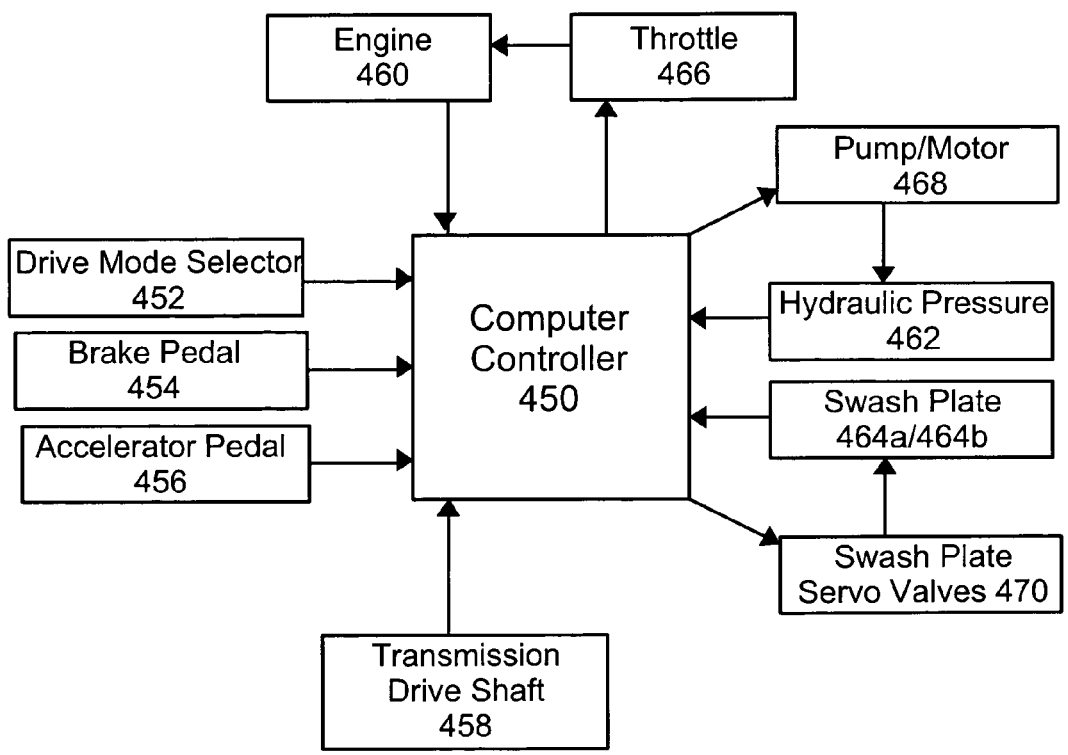
FIG. 10 is a block diagram of the preferred inputs and outputs of the computer controller in an embodiment of the present invention.

The communications between the computer controller and the various components of the automobile are shown schematically in FIG. 10. Whenever the vehicle's engine is turned on, the computer controller 450 continually monitors the inputs from the driver, namely the position of the drive mode selector 452, the position of the brake pedal 454, and the position of the gas pedal 456. The computer controller also monitors the speed of the engine drive shaft 458 to determine whether adjustments need to be made to change the speed of the drive shaft 458. When the driver inputs 452, 454, 456 indicate a desired change in drive shaft speed 458, the computer controller determines (a) the rate of fuel flow to the engine 460 as an indirect measure of engine speed, (b) the value of hydraulic pressure 462 in the pump and motor and the positions of (c) the pump swash plate 464a and (d) the motor swash plate 464b.

Computer controller 450 then uses a predetermined algorithm to achieve the desired change in drive shaft speed 458 most efficiently. This is accomplished by making one or more of the following changes: computer controller 450 may adjust the engine throttle 466 to change the rate of fuel flow to the engine 460, and/or may adjust the swash plate servo valves 470 to adjust the positions of one or both the pump and motor swash plates 464a, 464b.

A vehicle incorporating a transmission of the present invention preferably has the following features:

1. When the drive mode selector is moved from "Park" to "Drive" or "Neutral" but the brake is still being applied, the system avoids any build-up of hydraulic pressure in the closed-loop system by maintaining the pump swash plate in the 0° position.

2. When the drive mode selector is moved from "Park" to "Drive" or "Neutral" and pressure is removed from the brake pedal, the pump swash plate still remains at 0°, and the motor swash plate remains at +25°. As long as the pump swash plate remains at 0°, all fluid in the closed loop remains in a "no flow" condition. This maintains the wheel drive shaft in a "locked" position, providing a "hill holding" feature. Should the vehicle be in an extreme uphill or downhill condition, where the vehicle is moved by gravity in spite of the locked rear drive shaft, the pump swash plate is commanded to increase the flow of fluid slightly in either a + or − direction to maintain 0 MPH vehicle speed.

3. When the drive mode selector is in "Drive" and the brake is not being applied, as long as the accelerator is being depressed, calling for more hydraulic pressure/torque than is required to overcome tractive resistance torque, the angle of the pump swash plate is steadily increased in the + direction, moving fluid to the motor and increasing its rotation and the rotation of the vehicle drive shaft, accelerating the vehicle. Under these conditions, the vehicle continues to accelerate until the hydraulic pressure/torque is equal to the tractive resistance torque of the vehicle's wheels on the terrain. If the pressure on the accelerator is decreased, calling for a lower pressure set point, the angle of the pump swash plate is reduced to slow the acceleration of the vehicle until that set point is reached.

A transmission of the present invention fundamentally changes the way the automobile responds to driver inputs. In an automobile with either a standard or automatic geared transmission, when the driver calls for acceleration by pressing on the accelerator, power is increased to the wheel drive shaft by increasing the speed of the engine. Upon continued acceleration, when the engine reaches a certain high speed, the transmission shifts to a higher gear, either automatically or through the clutch by driver input, and the engine speed drops. In an automobile with a gearless transmission of the present invention, when the driver calls for acceleration by pressing on the gas pedal, power is increased by changing the swash plate ratio in the transmission, and the engine speed remains constant. Upon continued acceleration, only when the swash plate ratio reaches a certain value, is the engine speed increased to provide more power.

Since the hydraulics of a transmission of the present invention provide working torque at very low engine RPM's, a gasoline engine vehicle incorporating the present invention in place of the vehicle's original torque converter transmission operates at much lower engine speeds. This feature is due to the remarkable efficiencies that are achieved by using hydraulic machines having stationary cylinder blocks and rotating swash plates that vary through a preferable continuum of at least −25° to +25°.

A transmission of the present invention is capable of varying the speed of the drive shaft with minimal changes to engine speed. Thus, the present invention allows engine speed to remain in a relatively narrow low-to-moderate range where the combustion in HCCI engines is more easily controlled. A transmission of the present invention is highly compatible with implementation of more fuel efficient HCCI engines on gasoline-powered vehicles.

The pump-motors of the present invention preferably use no "dog bones". They preferably have minimal "blow-by", which is preferably less than 1 gallon per minute. They are preferably connected in a "closed loop". The pump-motors preferably have a traditional split swash plate, modified by adding bearings to support the nutating-only wobbler portion on the nutating/rotating rotor member. In one embodiment of the present invention, these bearings are needle bearings. They preferably have a mechanical valve system. Each pump-motor preferably includes a hold-down plate biased by a plurality of springs, each spring being positioned, respectively, circumferentially about the sliding shoe associated with the head of each piston. This combination of a split swash plate and a hold-down element significantly reduces the surface speed of the relative motion between the shoes and the swash plate and, thereby, results in reduced wear and costs and in a significant increase in machine efficiency.

Example: 2004 Chevy Tahoe All-Hydraulic Transmission Installation and Evaluation To demonstrate the modular nature and to quantify the fuel efficiency of an all-hydraulic transmission of the present invention, the automatic transmission of a 2004 Chevrolet Tahoe was removed and a transmission of the present invention was installed in its place.

The vehicle powertrain consisted of a GM 5.3L V8 engine directly coupled through a non-reduction gear to the infinitely variable transmission. The transmission consisted of a hydraulic pump and motor coupled only by the hydraulic flow. The pump, driven by the engine, produced the necessary swash plate-controlled flow that was directed to the hydraulic motor. The motor, by the position of its swash plate and being directly coupled to the drive shaft for the vehicle's drive wheels, produced the necessary torque in reaction to the drive wheel resistance torque.

The following inputs from the vehicle control modules to the infinitely variable transmission controller were used:

1. The drive mode selector with Park, Reverse, Neutral, Drive and Park Lock.
2. The accelerator pedal position sensor for driver indication of desired power.
3. Off idle switches for redundant control with the driver pedal at full off position.
4. Brake pedal sensor for driver indication of accelerated reduction of speed.

The following transmission components were installed for inputs to the computer controller:

1. Three hydraulic pressure transducers to monitor the high pressure pump, motor, and charge circuit pressure.
2. Two speed sensors to monitor the transmission input from the engine and output speeds to the rear driveshaft.
3. Two fuel flow meters for engine supply and return.
4. Two pump and motor swash plate positions LVDT.
5. Hydraulic charge circuit flow meter.

Outputs from the computer controller:

6. High pressure hydraulic safety solenoid valve.
7. Two high pressure pump and motor swash plate servo valves.

The various accelerator pedal/swash plate angle setting ratios calculated by computer controller are all initially calculated and, thereafter, tested with dynamometer data. For the prototype, initial calculations set system pressure at 200 PSI for engine idle conditions, building to a maximum of 3,800 PSI, with 167 lb-ft torque per each 1,000 PSI variation in differential pressure. For the prototype Tahoe vehicle, preliminary calculations indicate engine RPM range limits of 750 to 2,200, with transmission ratio limits of 25:1 (low-low) to 0.67:1 (overdrive). The intent of this prototype design is to keep the engine operating at its lowest RPM while maintaining adequate torque for all EPA tests. Since, for a given amount of torque required, the engine can produce that amount over a range of RPM and fuel delivery values, the computer controller algorithms are selected to attain highest fuel economy.

It should be indicated that, while it is intended that this invention be used modularly to replace existing transmissions in gas-engine vehicles, it is useable as a factory-installed unit and in diesel engine vehicles as well.

In this regard, should the invention be used with a vehicle that already has, or can modularly replace, its present high speed gasoline engine with a lower speed/higher torque engine such as that prevalent in the 1960-70's, the increase in gas efficiency will be markedly greater.

Thus, a transmission of the present invention is not only lighter in weight, simpler, and less expensive to build, but it also permits the world to retain its huge gas engine infrastructure, while improving fuel consumption comparable to that which might be achieved with diesel engines, thereby achieving much needed energy conservation without concomitant disruption in world fuel allocation.

The present invention opens the possibility of the auto industry to return to proven lower speed/higher torque engines, allowing the resulting efficiency improvements to be achieved with lighter, lower cost engines.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A modular transmission adaptable for use in a vehicle having an engine, an accelerator for indicating desired variations in vehicle velocity, a brake for indicating desired reductions in vehicle velocity, and an output drive for driving the wheels of the vehicle, said transmission comprising:

a plurality of hydraulic machines, each having a rotating shaft, elongated pistons that reciprocate within cylinders formed in a stationary cylinder block, and an angularly adjustable swash plate, said pistons having a stroke that is variable up to a predetermined maximum by angular adjustment of said swash plate;

said hydraulic machines, respectively, being (a) operable as a hydraulic pump with said respective hydraulic pump shaft being rotatable by the engine of said vehicle, (b) operable as a hydraulic motor with said respective hydraulic motor shaft being operatively connected to rotate said output drive of the vehicle, and (c) interconnected in a hydraulic closed loop;

a controller for determining the relative speed of said output drive of the vehicle, said controller being operable following the initiation of operation of said vehicle engine and being responsive to:
  the speed of said hydraulic pump shaft;
  the speed of said hydraulic motor shaft; and
  desired variations in vehicle velocity as indicated by operation of said accelerator and said brake; and said controller determining:
  said angular adjustment of the swash plate of said hydraulic pump;
  said angular adjustment of the swash plate of said hydraulic motor; and
  the speed of said engine;

said controller modifying the operation of said vehicle in accordance with said desired variations in vehicle velocity as indicated by operation of said accelerator and said brake while compensating for changes in vehicle load and variations in the terrain being traversed by the vehicle and automatically adjusting the speed of said engine to maximize predetermined parameters related to fuel economy.

2. The modular transmission of claim 1 wherein said controller varies:
  an infinitely variable increase in the speed of said output drive of the vehicle relative to said hydraulic pump shaft until said ratio reaches unity; and
  an infinitely variable increase in the speed of said output drive of the vehicle relative to said hydraulic pump shaft after said ratio reaches unity;
  thereby maximizing said predetermined parameters related to fuel economy throughout vehicle operation including during overdrive conditions after the said ratio reaches unity.

3. The modular transmission of claim 1 wherein, when said controller is operable following the initiation of operation of said vehicle engine, said desired variations in vehicle velocity, as indicated by operation of said accelerator and said brake, result in variations in the speed of said vehicle that are not directly related to changes in the speed of said engine and said engine speed is determined by said modular transmission.

4. The modular transmission of claim 1, wherein the engine is a homogeneous-charge-compression-ignition type engine.

5. A hydraulic transmission for an automobile having an engine, an engine drive shaft driven by the engine, and a wheel drive shaft for driving a plurality of wheels to move the automobile, the transmission comprising:
  a hydraulic pump and a hydraulic motor connected in a hydraulic closed loop, said pump and motor each comprising:
    a non-rotating cylinder block having a plurality of cylinders formed therein, said cylinders being positioned circumferentially at a first radial distance about the rotational axis of a drive element;
    a plurality of respective long pistons reciprocally mounted in said cylinders, each long piston comprising a piston body and a spherical head connected to the piston body and each respective cylinder having an open head portion beyond which the piston head extends at all times;
    a split swash plate driven by said drive element and comprising:
      a variably-inclined rotor that rotates and nutates; and
      a wobbler having a flat face that only nutates;
    wherein the stroke of each said piston varies in accordance with the inclination of said swash plate up to a predetermined maximum; and
  said drive element of said hydraulic pump being driven by said engine drive shaft; and
  said drive element of said hydraulic motor transmitting torque and power to said wheel drive shaft;
  wherein, when said engine is operating at a relatively constant speed and relatively low RPM, said hydraulic pump and said hydraulic motor provide sufficient torque and hydraulic motor provide sufficient torque and power to said wheel drive shaft to move the automobile from a stationary stop to highway speeds in a continuously accelerating motion without alteration of any intermediate gearing of any kind.

6. The transmission of claim 5 wherein each respective hydraulic machine further comprises a respective sliding shoe pivotally and directly affixed to each said piston head without any intermediate dog-bone, each said respective sliding shoe being maintained in direct sliding contact with the flat face of said wobbler during all relative rotary motions between the piston and the flat face.

7. The transmission of claim 5, wherein an angle of the swash plate varies from −25 to +25 degrees.

8. The transmission of claim 5, wherein each respective hydraulic machine further comprises:
  a respective lubricating channel formed in a cylindrical wall of each cylinder in said cylinder block for retaining pressurized fluid;
  all of said lubricating channels being interconnected to form a continuous lubricating passageway in said cylinder block;
  said pressurized fluid being retained in said continuous lubricating passageway by the substantial closure of each respective lubricating channel by an outer surface of an axially cylindrical body of each respective piston during an entire stroke of each piston, the only source of pressurized fluid received by said continuous lubricating passageway being a minimal flow of said fluid between each respective cylindrical wall of each cylinder and said axial cylindrical body of each respective piston; and
  said closed continuous lubricating passageway being formed entirely within said cylinder block, transecting each said cylinder and being centered circumferentially at substantially the same radial distance as said cylinders are centered about the rotational axis of the drive element.

9. The transmission of claim 5, wherein each respective hydraulic machine further comprises a hold-down assembly for biasing each sliding shoe toward said flat face of said wobbler.

10. The transmission of claim 5, wherein the engine is a homogeneous-charge-compression-ignition type engine.

* * * * *

UNITED STATES PATENT AND TRADEMARK OFFICE
CERTIFICATE OF CORRECTION

| | |
|---|---|
| PATENT NO. | : 7,416,045 B2 |
| APPLICATION NO. | : 11/153111 |
| DATED | : August 26, 2008 |
| INVENTOR(S) | : Keith E. Gleasman and Matthew R. Wrona |

It is certified that error appears in the above-identified patent and that said Letters Patent is hereby corrected as shown below:

<u>Column 18:</u>

Line 23 claim 5: replace "and hydraulic motor provide sufficient torque and power" with --and power--

Signed and Sealed this

Fourth Day of November, 2008

JON W. DUDAS
*Director of the United States Patent and Trademark Office*